United States Patent
Jibb et al.

(10) Patent No.: US 12,455,123 B2
(45) Date of Patent: Oct. 28, 2025

(54) HEAT EXCHANGER CLOSURE ASSEMBLIES AND METHODS OF USING AND INSTALLING THE SAME

(71) Applicant: Lummus Technology LLC, Bloomfield, NJ (US)

(72) Inventors: Richard Jibb, Monroe, NY (US); David Thomas Creech, Glen Ellyn, IL (US); Randy Lee Eberly, Plainfield, IL (US); Elizabeth MacLean Meacham, Lombard, IL (US); Henk Boekhouder, Zoetermeer (NL); Roberto Groppi, Hague (NL); Vincenzo Marco Brignone, Leiden (NL); Trevor Jaye, San Diego, CA (US)

(73) Assignee: Lummus Technology LLC, Bloomfield, NJ (US)

( * ) Notice: Subject to any disclaimer, the term of this patent is extended or adjusted under 35 U.S.C. 154(b) by 0 days.

(21) Appl. No.: 18/510,218

(22) Filed: Nov. 15, 2023

(65) Prior Publication Data

US 2024/0085126 A1 Mar. 14, 2024

Related U.S. Application Data

(60) Continuation of application No. 17/370,718, filed on Jul. 8, 2021, now Pat. No. 11,852,424, and a
(Continued)

(51) Int. Cl.
*F28F 9/02* (2006.01)
*F28D 7/00* (2006.01)
(Continued)

(52) U.S. Cl.
CPC .......... *F28F 9/0219* (2013.01); *F28D 7/0041* (2013.01); *F28F 9/005* (2013.01);
(Continued)

(58) Field of Classification Search
CPC .......... F28F 9/0219; F28F 9/005; F28F 9/013; F28F 9/0202; F28F 9/0212; F28F 9/0224;
(Continued)

(56) References Cited

U.S. PATENT DOCUMENTS 2,857,142 A 10/1958 Gertzon
2,872,065 A 2/1959 Hamersley
(Continued)

FOREIGN PATENT DOCUMENTS

AT 278876 B 2/1970
BR 8701689 A 4/1987
(Continued)

OTHER PUBLICATIONS

English translation of KR101479565 2015.*
(Continued)

*Primary Examiner* — Joel M Attey
(74) *Attorney, Agent, or Firm* — Seed Intellectual Property Law Group LLP

(57) ABSTRACT

A heat exchanger assembly including an elongated tubular heat exchanger enclosure defining an interior chamber. A tube sheet is positioned within the interior chamber of the heat exchanger enclosure separating the interior chamber into a shell side and a channel side. The interior portion is configured to removably receive a tube bundle positioned within the shell side of the interior chamber. An annular sleeve member is positioned within the channel side of the interior chamber of the heat exchanger enclosure. An annular elastic torsion member is positioned within the channel side of the interior chamber of the heat exchanger such that the sleeve member is positioned between the tube sheet and the elastic torsion member. The elastic torsion member has an inner circumference deflectable relative to its outer circumference for torsioning the elastic torsion member.

20 Claims, 8 Drawing Sheets

Related U.S. Application Data continuation of application No. 17/199,168, filed on Mar. 11, 2021, now Pat. No. 11,971,229, said application No. 17/370,718 is a continuation of application No. 16/358,932, filed on Mar. 20, 2019, now Pat. No. 11,079,185, said application No. 17/199,168 is a division of application No. 16/358,932, filed on Mar. 20, 2019, now Pat. No. 11,079,185.

(60) Provisional application No. 62/645,662, filed on Mar. 20, 2018.

(51) Int. Cl.
  F28F 9/00 (2006.01)
  F28F 9/013 (2006.01)
  F28F 21/00 (2006.01)

(52) U.S. Cl.
  CPC ............ F28F 9/013 (2013.01); F28F 9/0202 (2013.01); F28F 21/00 (2013.01); F28F 9/0212 (2013.01); F28F 9/0224 (2013.01); F28F 9/0226 (2013.01); F28F 9/0231 (2013.01); F28F 2220/00 (2013.01); F28F 2230/00 (2013.01); F28F 2265/26 (2013.01)

(58) Field of Classification Search
  CPC ........ F28F 9/0226; F28F 9/0231; F28F 21/00; F28F 2220/00; F28F 2230/00; F28F 2265/26; F28D 7/0041
  USPC ........................................................ 165/162
  See application file for complete search history.

(56) References Cited

U.S. PATENT DOCUMENTS

| | | | |
|---|---|---|---|
| 3,114,415 A | 12/1963 | Wintzer | |
| 3,526,275 A | 9/1970 | Eirikis et al. | |
| 3,537,611 A | 11/1970 | Heinz | |
| 3,948,315 A * | 4/1976 | Powell | F28F 9/0219 |
| | | | 165/158 |
| 4,102,465 A | 7/1978 | Zahid | |
| 4,750,554 A | 6/1988 | Oeij et al. | |
| 4,961,464 A | 10/1990 | Wollbeck et al. | |
| 5,048,596 A | 9/1991 | Lu | |
| 5,755,277 A | 5/1998 | Appel et al. | |
| 5,984,001 A | 11/1999 | Welkey | |
| 6,193,284 B1 | 2/2001 | King | |
| 10,641,559 B2 | 5/2020 | Yoo et al. | |
| 2001/0021190 A1 | 9/2001 | Hummel | |
| 2002/0144806 A1 | 10/2002 | Gokan et al. | |
| 2005/0034847 A1 | 2/2005 | Graham et al. | |
| 2009/0095453 A1 | 4/2009 | Modi et al. | |
| 2009/0120608 A1 | 5/2009 | Modi et al. | |
| 2009/0133862 A1 | 5/2009 | Modi et al. | |
| 2009/0224426 A1 | 9/2009 | Micarelli | |
| 2012/0024321 A1 | 2/2012 | Hays | |
| 2012/0103007 A1 | 5/2012 | Mitsuhashi et al. | |
| 2012/0175096 A1 | 7/2012 | Hakamata et al. | |
| 2013/0192800 A1 | 8/2013 | Tiberghien et al. | |
| 2014/0196700 A1 * | 7/2014 | Bucher | F28D 7/1684 |
| | | | 165/158 |

FOREIGN PATENT DOCUMENTS

| | | | |
|---|---|---|---|
| CN | 1230649 A | 10/1999 | |
| CN | 1135787 C | 1/2004 | |
| CN | 102782435 A | 11/2012 | |
| CN | 103223718 A | 7/2013 | |
| CN | 106461266 A | 2/2017 | |
| CO | 92136241 A | 2/1974 | |
| DE | 3639001 C1 | 4/1988 | |
| DE | 102006058386 A1 | 6/2007 | |
| EP | 0097324 A2 | 1/1984 | |
| ES | 200895 U | 9/1975 | |
| GB | 2 041 191 A | 9/1980 | |
| GB | 2041292 A | 9/1980 | |
| JP | 2012145237 A | 8/2012 | |
| KR | 101479565 B1 * | 1/2015 | F28D 7/16 |
| TW | 330981 B | 5/1998 | |
| TW | 358869 B | 5/1999 | |
| WO | 2007/122631 A2 | 11/2007 | |
| WO | WO 2008015691 A2 | 2/2008 | |

OTHER PUBLICATIONS

Jing Fang et al., "Structure and Manufacturing of Diaphragm Heat Exchangers," *Petro-Chemical Equipment* 44(3): 66-69, May 2015. (4 pages).

Extended European Search Report for European Patent Application No. EP19771967.7, dated Oct. 25, 2021.

International Search Report and Written Opinion for PCT Application No. PCT/US2019/023097, dated Jul. 4, 2019.

IMB, "Breech-Lock Closure High Pressure Heat Exchangers," Breech Lock Presentation Dec. 2004 TCM24 226146, Apr. 10, 2015, URL=https://vdocuments.mx/breech-lock-presentation-dec2004-tcm24-226146.html?page=1, download date Oct. 19, 2023. (24 pages).

Koch Heat Transfer Company, "Lummus Advanced Breech-Lock Exchanger® Heat Exchanger," Nov. 21, 2015, URL=https://vdocuments.mx/breechlock.html?page=2, download date Oct. 19, 2023. (19 pages).

KW Designed Solutions, "High Pressure Testing Systems with Breech Lock Closures," Aug. 8, 2017, URL=https://www.kwdesign.co.uk/products/pressure-vessel-closures/breech-lock-closure-vessels/, download date Oct. 19, 2023. (12 pages).

KW Group Ltd, "Pressure Testing Vessel Breech Lock Closure," YouTube Video, May 3, 2017, URL=https://vdocuments.mx/khtbreech-lock.html?page=1, download date Oct. 19, 2023. (1 pages) (Screenshot).

KW Group Ltd, "Pressure Testing Vessel Breech Lock Closure," Video Screenshot, retrieved from https://youtu.be/o37h0069BQA, May 3, 2017. (1 page).

Office Action, dated Sep. 24, 2023, for Columbian Patent Application No. NC2023/0002912. (11 pages).

* cited by examiner

HEAT EXCHANGER CLOSURE ASSEMBLIES AND METHODS OF USING AND INSTALLING THE SAME

CROSS REFERENCE TO RELATED APPLICATIONS

This application is a continuation of U.S. patent application Ser. No. 17/370,718 filed Jul. 8, 2021 and U.S. patent application Ser. No. 17/199,168 filed Mar. 11, 2021, which both claim priority to U.S. patent application Ser. No. 16/358,932 filed Mar. 20, 2019, now U.S. Pat. No. 11,079,185 issued Aug. 3, 2021, which claims priority to U.S. Patent Application Ser. No. 62/645,662 filed Mar. 20, 2018, all of which are incorporated herein by reference in their entirety.

FIELD OF THE INVENTION

The disclosed embodiments relate to heat exchanger closure assemblies and methods for using and installing the same, and more particularly to closure systems and methods for sealing high pressure shell-and-tube type heat exchangers having removable tube bundles, and still more particularly to heat exchanger closure assemblies which are configured to accommodate varying thermal loads having a closure plug assembly that is secured to the channel of the heat exchanger using locking assembly.

BACKGROUND OF THE INVENTION

Shell-and-tube type heat exchangers constitute the bulk of the unfired heat transfer equipment in chemical plants, petroleum refineries, steam plants, and similar installations. Heat exchangers having removable tube bundles, such as those with U-tubes and a floating head, or having non-removable bundles with fixed tube sheets are among the most popular exchangers of the principal types of shell-and-tube heat exchangers in current usage. In practice, it is usually desirable to have a removable tube bundle such that the heat exchanger can be periodically removed from service, the tube bundle removed for cleaning and inspection and then re-assembled. It may also be desirable to hydrostatically or pneumatically test the shell side of tubular heat exchangers, with removable tube bundles, so that inspection or verification of the tube joints and tube sheet gaskets can be made and leaks can be readily located and serviced. In order to remove the bundle there must be provided a closure that can be opened quickly and reliably after a long period operating under varying thermal and pressure loads. The problems associated with disassembly, removal, hydrostatic and pneumatic testing and re-assembly are particularly acute when the tubular heat exchanger is relatively large (over 36 inches in diameter) and intended for high pressure operations exceeding 1000 psi since the weight of the components required becomes large. A particular type of closure that has been developed for this purpose is a "screw plug" also known as "breechlock" type closure which uses a plurality of interlocking threads to secure a lock ring cover assembly in place. The main advantage of this type of system is that it eliminates the large channel cover flange and bolting of other conventional high pressure exchanger designs. There are two common classifications of screw plug type heat exchangers described in the prior art. In applications where pressures exceed 1000 psi on both sides of the tube sheet such that the tube sheet itself is subject only to a lower differential pressure, it is possible to provide a fully removable "A-Style" closure whereby the bundle can be removed without removing the shell cover. If the differential pressure is too high it may be more convenient to remove the shell cover to access the bundle in which case a "B-Style" closure can be used.

Moreover, the closure assemblies used in heat exchangers of this type must be rigid enough to contain the internal pressure without significant movement of the closure assembly relative to the channel, since this would lead to partial or full disengagement of the threads used to secure the closure assembly. However, the assembly must also be flexible enough to accommodate expected thermal loads occurring during operation. Expected thermal loads are changes in temperature over time which can occur during initial start up or following repairs, or in the event of an upset or plant trip, any of which singular event can result in a differential thermal expansion of the internal components relative to the channel. The thermal loads, if not properly accommodated for in one or more embodiments, may in turn cause uneven plastic deformation of the internals such that gasket load is no longer evenly distributed and eventually the assembly begins to leak. In particular since the internal components of the heat exchanger are often subject to higher thermal expansion than the channel, due to differing coefficients of thermal expansion or the fact that the thinner internals may heat at a faster rate than the thick channel materials, a rigid closure assembly is not desirable if it results in: plastic deformation of internals which leads to gasket unloading and leakage; and higher load on the threaded portions of the closure assembly and channel which can lead to thread deformation. All of the above circumstances and operating conditions have led to the adoption of many different technical solutions, which have only been partially successful because they have only resolved some of the problems and while introducing others, especially for applications where temperature, pressure and size are on the high side.

In all of these prior art solutions, a threaded lock ring and cover assembly (or "closure plug") must be rotated several times, usually 20 or more, in order to fully engage the threads in the lock ring with the threads in the channel of the heat exchanger. This introduces a special handling consideration since the lock ring assembly must be accurately centered and supported whilst outside the channel and rotated into position. In particular since the weight of the closure plug cannot be allowed to rest on the threads, precision of handling such a heavy piece of equipment (as much as 21,000 lb) requires a specialized jig to be supplied with the heat exchanger. Various jig designs have been developed. In some cases a cantilevered system of counterweights is used to balance the weight of the lock ring. In other cases the jig is attached directly to the channel.

However, the special jig has no other function and may be used so infrequently that the crew working on the exchanger are inexperienced and rely completely on instructions provided by the manufacturer. In the worst case there is a risk of injury to plant personnel working on the exchanger if the heavy assembly is not secured to the jig correctly. There is always a risk that the closure plug may become jammed or the threads may be damaged during insertion or removal. This is particularly true when the closure plug is first inserted into the heat exchanger channel. Time is critical during plant turnaround or repairs, so any unplanned downtime associated with a stuck closure plug can represent a significant financial loss to the plant or refinery.

The difficulty of handling the lock ring means it is not desirable to insert and remove the lock ring more than once during a maintenance event. If it is necessary to perform repairs on the tubes, or other pressure retaining components, a shell side hydrostatic or pneumatic test must be performed without the cover in place in order to inspect and ensure that there are no leaks. Early designs used a temporary internal flange to load the gasket when hydro testing the shell side of the heat exchanger. Later designs such as that shown in U.S. Pat. No. 4,750,554 provide a mechanism to apply the load from the internal flange in parallel with the load from the inner row of bolts. For these later designs the inner row of bolts located in the external lock-ring are used to load the tube sheet gasket only in the event of a leak. The internal components required to achieve this function can become quite complicated, and whilst the design has been well optimized, the number of parts and complexity increases the risk that they could be installed incorrectly as well as introducing more fabrication costs. Since the internal flange is in contact with process fluid, the bolts can become corroded or covered in coke formations and may have to be cut or drilled out. Moreover the differential thermal expansion of the internal components can cause damage to or can deform the internal flange assembly leading to difficulty in removing and re-using the assembly.

Hence the prior art does not address the problem of handling the closure plug during insertion/removal and allowing pressure testing whilst maintaining a simpler design for internals.

Whilst a screw closure plug heat exchanger may meet the applicable design codes with respect to pressure containing parts, there are other components inside the pressure boundary of the equipment design that will impact the reliability and life cycle cost of this type of equipment. There is a need for a device which will be rigid enough to limit movement under pressure load, whilst avoiding damage to internals under expected thermal load conditions and providing fail-safe protection to the pressure retaining structure (threads) etc. under extreme thermal load conditions.

Therefore, there is an unsatisfied need in the art for a heat exchanger closure assemblies which are configured to accommodate varying thermal loads and which includes a lock ring and cover that can be more easily installed and removed as needed and without the use of specialized handling equipment.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, closure systems and methods for shell-and-tube type heat exchangers are described in which heat exchanger closure assemblies are configured to accommodate varying thermal loads and include a lock ring that is secured to the channel of the heat exchanger using a plurality of interlocking hubs or threads As previously noted, the following are of particular concern to end users of shell-and-tube type heat exchangers: leakage across gaskets leading to process fluids such as hydrogen/hydrocarbon escaping into environment; process leaks between the shell-side and tube-side fluids; longer than expected maintenance times due to sticking of the closure plug during insertion/removal; and complexity of large number of internal components and specialized equipment that is required to support the closure plug during insertion or removal.

In accordance with the certain embodiments illustrated herein, the presently disclosed methods/systems for opening, closing and sealing a high pressure heat exchanger employ a cover and a lock ring assembly (e.g., a closure plug) whereby the closure plug is inserted into the heat exchanger channel in one linear motion and rotated preferably by less than one single turn (e.g., a turn less than 360 degrees) into a locked position. The load bearing surfaces (e.g., hubs) are preferably not in contact until the final rotation is applied effectively locking the closure plug to the high pressure heat exchanger. The channel of the high pressure heat exchanger is preferably machined with a first set of hubs and the lock ring is machined with a second complimentary set of hubs such that when the closure plug is rotated the first set of hubs releasably engage with the second set of hubs. In certain embodiments, a rail may be attached adjacent to one or more sets of hubs on the lock ring and/or channel to provide a raised section along one side which: (i) prevents over rotation; (ii) provides a bearing surface for insertion of the lock ring assembly; and (iii) prevents damage to load bearing surfaces.

In certain illustrative embodiments, the lock ring is machined with a prescribed number (e.g., 8) of lock ring hub sets and the heat exchanger channel is machined with a corresponding number of channel hub sets. Those skilled in the art will readily appreciate that the number of corresponding sets of hubs can be varied without departing from the inventive aspects of the present disclosure. In certain illustrative embodiments, the hub profile is a buttress shape.

It is to be appreciated that certain advantages of the illustrated embodiments include a closure plug assembly that can be installed with a single linear motion and without the need for a specialized jig or tool. Only once the closure plug assembly is in position and fully supported by heat exchanger channel, is it locked into position by a single partial turn (for instance, a 22.5° turn of the plug member). The risk of the closure plug being stuck relative to a heat exchanger channel is eliminated. Additionally, handling of a plug member is safer since no rotation is required until the closure plug is fully supported relative to a heat exchanger. Readily available plant equipment such as cranes, bundle pulling trucks and fork lift trucks may be used to move a closure plug member in place thereby eliminating the cost associated with a specialized jig. The installation is safer because the lock ring assembly/plug does not need to be simultaneously rotated whilst hung and centered using counterweights or cantilever but instead is preferably slid in along specially designed rails which also serve to provide a rotation stop The rails are sized so as to ensure that the lock ring assembly of the closure plug does rests its entire weight on the load bearing surfaces of the hubs.

In accordance with illustrated embodiments, insertion and removal of the closure plug assembly can be accomplished more quickly than the prior art threaded design. Faster insertion and removal enables the use of simplified internals, in particular by eliminating the need for an internal flange. In certain embodiments, to lock the ring of the closure plug assembly in place, only a partial turn (e.g., 22.5°), of the closure plug assembly relative to the heat exchanger tube is required, in contrast to the typical 20 or more full turns of the prior art design. As a result, flexibility is provided in selecting the load bearing surface shape of the closure plug to be more optimal than the traditional 1" ACME thread used in the prior art.

With regards to prior art design and methods, the tightening of a screw thread is comparable to driving a wedge into a gap until it sticks fast through friction and slight plastic deformation. Thus, a thread must advance through some linear distance whilst rotating in order to be fully engaged. The prior art designs typically used an ACME style thread, usually on a 1" pitch such that one full turn advances the plug 1 inch into the channel. In contrast, the hub designs of the certain illustrated embodiments of the present invention are, for instance, a male-female interlocked or interdigitated geometry, which engage through rotation in a single plane, which preferably use a hub shape (e.g., buttress configuration) which is stiffer and more appropriate when the force on the hub is primarily in one direction. Rails are provided and configured on the hubs to ensure that the lock ring of the plug assembly is centered correctly during insertion and cannot over rotate. The rails also function to protect the hubs during assembly of the closure plug member with the heat exchanger tube.

Thus, a distinct advantage provided by the illustrated embodiments is elimination for requiring specialized "jigs" required to support and center a lock ring while it is being rotated. In accordance with the illustrated embodiment of the present invention, rotation of the closure plug occurs once the lock ring of the plug is fully inserted in the channel, so the lock ring design significantly reduces the time it takes to open and close the heat exchanger for maintenance operations, eliminates the need for special equipment/handling and thus reduces the risk that an incorrect installation will result in a leak. By reducing the opening and closing time, it is also possible to eliminate an internal flange used for pressure testing purposes, which greatly reduces the number of components that must be installed/removed to obtain access to the tube bundle.

It is to be appreciated the illustrated embodiments of the present invention are directed to heat exchanger constructions permitting thermal expansion under varying thermal loads during operation through the use of an elastic torsion member. By accommodating expected thermal expansion with an elastic torsion member, sealing can be maintained through multiple operating cycles without adjustment of compression bolts provided on a closure plug. Expected thermal loads include heating and cooling of components due to start up, shut down, fluctuations in fluid flow rates and infrequent but foreseeable events such as a plant trip or sudden shutdown. In the event of an extreme thermal load that causes the thermal expansion of the internals to be beyond the range considered in the design, it is critical to protect the hubs of the closure assembly from damage, thus the torsion member is designed and configured to deform plastically above a certain range of elastic deflection. It is to be appreciated that with prior designs and methods, the use of specialized assembly procedures was required to maintain sealing of an internal tubesheet gasket, often involving re-tightening of compression bolts during operation. Even with these procedures, plastic deformation of internal members can occur during operation due to differential thermal expansion. As noted above, this has been obviated by the present invention.

In accordance with certain illustrated embodiments of the present invention, closure assemblies are designed to seal a high pressure shell and tube heat exchanger, and are configured as a "screw plug" type, which maintain a seal at the heat exchanger tubesheet under pressure and varying thermal loads. External sealing of the closure assembly is preferably provided by a diaphragm and gasket assembly. The diaphragm gasket seal is preferably maintained by an outer row of push bolts, and internal sealing is provided preferably by a second gasket located at the tube-sheet which is loaded by an inner row of push bolts. In accordance with the certain illustrated embodiments, internal sealing load of a heat exchanger tubesheet is transmitted through a compression ring, an elastic torsion member and a sleeve member. It is to be understood the elastic torsion member pivots at the areas where it contacts the sleeve member and the compression ring.

During an assembly procedure of the certain illustrated embodiments of the present invention, a tube bundle with a tubesheet gasket is inserted in an heat exchanger tube, followed by a sleeve member, an elastic torsion member and then the closure plug member preferably having a cover and lock ring assembly. Additionally, a diaphragm and diaphragm gasket is provided adjacent to the closure plug in the heat exchanger tube for providing a leak tight seal. The closure plug member is removably secured to an open end channel of the heat exchanger tube by turning the closure plug member coaxially about the longitudinal axis of the heat exchanger in one linear motion, and preferably rotated by less than one single turn so as to be disposed in a locked position. It is to be appreciated, the load bearing surfaces are not in load bearing contact with one another until a final rotation of the closure plug is applied.

In accordance with the certain illustrated embodiments of the present invention, the aforesaid load bearing surfaces of the closure plug and the open end channel of the heat exchanger tube preferably include a first set of hubs provided (e.g., machined) on the closure plug and a second complimentary set of hubs provided (e.g., machined) on the open end channel portion of the heat exchanger tube such that when the closure plug is rotated, the first set of hubs engage (interdigigate) with the second set of hubs. It is to be appreciated that one or more sets of hub sections may be provided on the closure plug and/or open end channel of the heat exchanger so as incorporate a raised section (e.g., a rail) configured to (i) prevent over rotation, (ii) provide a bearing surface for insertion of the closure plug, while (iii) preventing damage to load bearing surfaces of both the closure plug and the open end channel of the heat exchanger tube.

In yet another aspect, provided is a heat exchanger assembly including an elongated tubular heat exchanger enclosure defining an interior chamber. A tube sheet is positioned within the interior chamber of the heat exchanger enclosure separating the interior chamber into a shell side and a channel side. The interior portion is configured to removably receive a tube bundle positioned within the shell side of the interior chamber. An annular sleeve member is positioned within the channel side of the interior chamber of the heat exchanger enclosure. An annular elastic torsion member is positioned within the channel side of the interior chamber of the heat exchanger such that the sleeve member is positioned between the tube sheet and the elastic torsion member. The elastic torsion member has an inner circumference deflectable relative to its outer circumference for torsioning the elastic torsion member. Additionally, the heat exchanger may further one or more of the following: i) a partition assembly wherein the sleeve member is positioned within the channel side of the interior chamber of the heat exchanger enclosure to direct fluid from a port extending through the enclosure to at least two or more tubes in a tube bundle; ii) a tube sheet gasket positioned between the tube sheet and a shoulder formed within the interior chamber of the heat exchanger enclosure and a bearing ring positioned within the interior chamber of the heat exchanger enclosure with the elastic torsion member positioned between the sleeve member and the bearing ring; iii) at least two ports extending through the enclosure for allowing fluid to enter and exit the channel side of the interior chamber of the heat exchanger enclosure; iv) the elastic torsion member being configured to deflect elastically up to an elastic deflection limit and deflect plastically above the elastic deflection limit such that the elastic torsion member deflects elastically to accommodate differential thermal expansion and avoid damage to components of the heat exchanger when the heat exchanger is under preload and expected pressure and thermal loads; v) the elastic torsion member being configured to pivot at a first contact area where the elastic torsion member contacts the sleeve member and at a second contact area the elastic torsion member contacts the bearing ring; vi) the elastic torsion member having a quadrilateral cross-section having rounded corners; vii) a plurality of elastic torsion members stacked in series relative to one another; viii) the elastic torsion member being configured to have an outer radius "A" and an inner radius "B", wherein the outer radius is less than an inner radius of a channel of the interior chamber configured to receive a tube bundle, wherein the ratio of "A" to "B" is less than 3; ix) the elastic torsion member being configured to have a height "H" that is approximately 50% of its elastic deflection limit, and has a thickness "T" such that the elastic torsion member deforms plastically above its elastic deflection limit; x) a closure assembly for sealing the channel side of the interior chamber of the heat exchanger enclosure, wherein the closure assembly includes a lock ring member and a cover member which are removably secured to the heat exchanger enclosure with a locking assembly; xi) the locking assembly including a plurality of spaced-apart lock ring hub sections configured to interdigitate with corresponding channel hub sections formed on a cylindrical inner surface portion of the heat exchanger enclosure; xii) a diaphragm positioned with the channel side of the interior chamber adjacent to the lock ring and cover members and a diaphragm gasket compressed against the diaphragm when the lock ring member is removably secured to the heat exchanger enclosure.; xiii) the closure assembly further including a plurality of first elongate compression members provided along an outer radius portion of the closure assembly so as to transmit a force to a first compression ring, which transmits a force to a rim portion of the diaphragm and the diaphragm gasket and a plurality of second elongate compression members provided along an inner radius portion of the closure assembly so as to transmit a force to a second compression ring, which transmits a force against a portion of the diaphragm causing a portion of the diaphragm to deflect distal from the cover member and towards the elastic torsion member when the closure assembly is removably secured to the heat exchanger enclosure; xiv) the tube sheet, sleeve member, bearing ring, first and second compression rings, lock ring, and first and second compression members being configured to remain elastic up to or above a total axial load from preload, thermal and pressure loads when the closure assembly is secured to the heat exchanger enclosure; xv) wherein the elongate compression members are preloaded, the compression members impart the preload through a first axial load path to a first contact area of the elastic torsion member, which transmits the preload through a torsional load path through the elastic torsion member to a second contact area of the elastic torsion member, which transmits the preload through a second axial load path to a tube sheet gasket; xvi) wherein pressure loads from process fluids in the heat exchanger are within a normal prescribed threshold range, the elastic torsion member is configured to deform elastically enabling its outer circumference to axially move towards the closure assembly, pressure loads from process fluids in the heat exchanger enclosure reduce load on the elastic torsion member by deforming the closure assembly distal from the tube sheet, and the elastic torsion member is configured to deflect elastically up to an elastic deflection limit and deflect plastically above the elastic deflection limit such that the elastic torsion member accommodates differential thermal expansion to avoid damage to components of the heat exchanger when the heat exchanger is under preload and expected pressure and thermal loads.

In yet another aspect, provided is a process for assembling a tube heat exchanger assembly including providing an elongated heat exchanger enclosure having an interior chamber and defining a longitudinal axis and having an open cylindrical channel end. A closure assembly is provided having a locking assembly configured to secure to the open cylindrical channel end of the elongated heat exchanger enclosure. The locking assembly of the closure assembly is inserted into the open cylindrical channel end axially along the longitudinal axis of the interior chamber of the heat exchanger such that load bearing surfaces of each of the closure assembly and an interior wall of the elongated heat exchanger enclosure do not contact one another. The closure assembly is turned about the longitudinal axis of the elongated heat exchanger enclosure to cause the locking assembly to removably secure to a cooperating locking assembly provided on the interior wall of the elongated heat exchanger enclosure to cause the load bearing surfaces to contact one another such that a load is transferred between the closure assembly and the elongated heat exchanger. Additionally, the process for assembling the tube heat exchanger may further one or more of the following: i) the closure assembly is turned less than 360 degrees to cause the locking assembly of the closure assembly to removably secure to the cooperating locking assembly provided on the interior wall of the elongated heat exchanger enclosure; ii) the locking assembly of the closure assembly and the locking assembly provided on the interior wall of the elongated heat exchanger enclosure cooperatively form a bayonet locking assembly iii) the bayonet locking assembly including a plurality of spaced-apart lock ring hub sections provided on an outer surface portion of the closure assembly and a plurality of spaced-apart lock ring hub sections provided on the interior wall of the elongated heat exchanger enclosure configured to interdigitate with corresponding channel hub sections formed on the closure assembly; iv) prior to inserting the locking assembly, inserting a tube sheet gasket into the open cylindrical channel end axially along the longitudinal axis of the elongated heat exchanger enclosure to be positioned adjacent a channel shoulder configuration formed in the elongated heat exchanger enclosure, inserting a tube sheet into the open cylindrical channel end axially along the longitudinal axis of the elongated heat exchanger enclosure to be positioned adjacent the tube sheet gasket so as to define a shell side and a channel side within the interior chamber of the elongated heat exchanger enclosure, wherein the interior chamber is configured to removably receive a tube bundle positioned within the shell side of the interior chamber, inserting an annular sleeve member into the open cylindrical channel end axially along the longitudinal axis of elongated heat exchanger enclosure to be positioned adjacent the tube sheet, inserting an elastic torsion member into the open cylindrical channel end along the longitudinal axis of the elongated heat exchanger enclosure so as to be positioned adjacent the sleeve member, inserting a bearing ring into the open end of the cylindrical channel along the longitudinal axis of the elongated heat exchanger enclosure so as to be positioned adjacent the elastic torsion member, and inserting a diaphragm into the open end of the cylindrical channel along the longitudinal axis of the elongated heat exchanger enclosure so as to be positioned adjacent the bearing ring; v) adjusting a plurality of first outer elongate compression members provided along an outer radius portion of the closure assembly which extend in the closure assembly coaxially along longitudinal axis of the closure assembly so as to transmit a force to a first compression ring, which transmits a force to a rim portion of the diaphragm and the diaphragm gasket so as to compress the diaphragm gasket against the diaphragm, and adjusting a plurality of second inner elongate compression members provided along an inner radius portion of the closure assembly which extend in the closure assembly coaxially along longitudinal axis of the closure assembly so as to transmit a force to a second compression ring, which transmits a force against a portion of the diaphragm causing a portion of the diaphragm to deflect distal from the closure assembly and towards the elastic torsion member of heat exchanger assembly when the closure assembly is secured to the heat exchanger enclosure; vi) wherein the tube sheet, sleeve member, first and second compression rings, closure assembly, and each of the first and second elongate compression members are configured to remain elastic up to or above a total axial load from preload, thermal and pressure loads when the closure assembly is secured to the heat exchanger enclosure; vii) wherein when the elongate compression members are preloaded, the compression members impart the preload through a first axial load path to a first contact area of the elastic torsion member, which transmits the preload through a torsional load path through the elastic torsion member to a second contact area of the elastic torsion member, which transmits the preload through a second axial load path to a tube sheet gasket; viii) wherein the torsional load is resisted by an increase in stress and a torsional rotation enabling the first contact area of the elastic torsion member to move towards the tube sheet; ix) wherein the closure assembly includes positioning a cylindrical shaped cover member having an outer diameter to be secured concentric with an interior portion of a cylindrical shaped lock ring member defining a cylindrical outer surface portion and a cylindrical shaped interior portion wherein the outer surface portion is provided with the locking assembly of the closure assembly.

In still another aspect, provided is a closure assembly configured to removably secure to an open channel end of an interior chamber of a heat exchanger assembly including a cylindrical shaped lock ring member defining a cylindrical outer surface portion and a cylindrical shaped interior portion. The outer surface portion is provided with a plurality of spaced-apart lock ring hub sections configured to interdigitate with corresponding channel hub sections formed on a cylindrical inner surface portion of the heat exchanger assembly. A cylindrical shaped cover member secured is concentric with the interior portion of the lock ring member. Additionally, the closure assembly may further one or more of the following: i) wherein the cover member is removably secured to the lock ring member with the lock ring member having an inner diameter surface with a shoulder configuration configured receive a cooperating shoulder configuration provided on an outer diameter surface of the cover member; ii) each lock ring hub section extends at prescribed angle extending from the outer surface portion of the lock ring member configured to interdigitate with corresponding angled hub sections provided in each channel hub section formed on the cylindrical inner surface portion of the heat exchanger assembly; iii) an upwardly extending flange member provided on the lock ring member configured to stop rotation of the closure assembly into the interior chamber of the heat exchanger assembly; iv) a diaphragm configured to be positioned adjacent to the lock ring and cover members; v) a plurality of adjustable outer elongate lock ring compression members removably securable in the lock ring member, each outer elongate lock ring compression member passing through a respective hole coaxially formed with a longitudinal axis in the lock ring member so as to transmit a force to a first compression ring, which transmits a force to a rim portion of the diaphragm, and a diaphragm gasket compressed against the diaphragm such that the diaphragm is positioned intermediate the diaphragm gasket and the first compression ring member through adjustment of the outer elongate lock ring compression members when the lock ring member is removably secured to the interior chamber of the tubular heat exchanger assembly; vi) a plurality of inner adjustable elongate cover compression members removably securable in the cover member, each inner elongate cover compression member passing through a respective hole coaxially formed with a longitudinal axis in the cover member so as to transmit a force to a second compression ring, which transmits a force against a portion of the diaphragm causing a portion of the diaphragm to deflect distal from the cover member and towards the interior chamber of heat exchanger assembly when the closure assembly is removably secured to the open end of the interior chamber of the heat exchanger assembly; vii) wherein the first and second compression rings, compression rods and compression bolts are configured to remain elastic up to or above a total axial load from preload, thermal and pressure loads when the closure assembly is removably secured to the open end of the interior chamber of the heat exchanger assembly; viii) wherein the outer surface portion of the lock member is provided with an upstanding groove formed substantially perpendicular to the longitudinal axis of the lock ring member configured to slidably receive in a corresponding notch formed in the inner surface portion of the heat exchanger assembly perpendicular to the longitudinal axis of the heat exchanger axis for facilitating insertion of the lock ring member in the inner surface portion of the heat exchanger assembly.

In yet still another aspect, provided is an operation method for a heat exchanger assembly having a tubular heat exchanger enclosure configured for accommodating differential thermal expansion of internal components in an interior chamber of the heat exchanger enclosure during heating and cooling sequences, including receiving a preload with an elastic torsion member within the interior chamber of the heat exchanger enclosure such that the elastic torsion member receives a torsional load and elastically deflects to accommodate the preload. A thermal load is received with the heat exchanger assembly to differentially thermally expand the internal components in the interior chamber of the heat exchanger enclosure such that the torsional load received by the elastic torsion member increases and further elastically deflects to accommodate the thermal load. Additionally, the operation method for a heat exchanger may further one or more of the following: i) receiving a pressure load within the interior chamber of the heat exchanger enclosure that reduces the torsional load received by the elastic torsion member by elastically deflecting a closure assembly removably attached to the heat exchanger enclosure and relaxing the elastic torsion member to accommodate the pressure load; ii) wherein the differentially thermally expanding the internal components comprises accommodating differential thermal expansion of at least the bearing ring, elastic torsion member, sleeve member and tube sheet without causing plastic deformation of at least the bearing ring, elastic torsion member and sleeve member; ii) wherein elongate compression members are used to preload the elastic torsion member such that the compression members impart the preload through a first axial load path to a first contact area of the elastic torsion member, which transmits the preload through a torsional load path through the elastic torsion member to a second contact area of the elastic torsion member, which transmits the preload through a second axial load path to a tube sheet gasket; iii) wherein the elastic torsion member is configured to pivot at the first contact area where the elastic torsion member contacts a sleeve member and at the second contact area where the elastic torsion member contacts a bearing ring; iv) inserting a tube sheet gasket into an open cylindrical channel end axially along the longitudinal axis of the elongated heat exchanger enclosure to be positioned adjacent a channel shoulder configuration formed in the elongated heat exchanger enclosure, inserting a tube sheet into the open cylindrical channel end axially along the longitudinal axis of the elongated heat exchanger enclosure to be positioned adjacent the tube sheet gasket so as to define a shell side and a channel side within the interior chamber of the elongated heat exchanger enclosure, wherein the interior chamber is configured to removably receive a tube bundle positioned within the shell side of the interior chamber, inserting an annular sleeve member into the open cylindrical channel end axially along the longitudinal axis of elongated heat exchanger enclosure to be positioned adjacent the tube sheet, inserting an elastic torsion member into the open cylindrical channel end along the longitudinal axis of the elongated heat exchanger enclosure so as to be positioned adjacent the sleeve member, inserting a bearing ring into the open end of the cylindrical channel along the longitudinal axis of the elongated heat exchanger enclosure so as to be positioned adjacent the elastic torsion member; and inserting a diaphragm into the open end of the cylindrical channel along the longitudinal axis of the elongated heat exchanger enclosure so as to be positioned adjacent the bearing ring; and v) affixing a closure assembly to an open end portion of the interior chamber, the closure assembly including a deflectable diaphragm and bearing ring and further including a mechanism for imparting the preload to the elastic torsion member.

These and other unique features of the closure assembly disclosed herein will become more readily apparent from the following description and the accompanying drawings.

BRIEF DESCRIPTION OF THE DRAWINGS

So that those having ordinary skill in the art to which the disclosed systems and methods appertain will more readily understand how to make and use the same illustrating various non-limiting, example, inventive aspects in accordance with certain illustrated embodiments, reference may be had to the drawings wherein.

DETAILED DESCRIPTION CERTAIN EMBODIMENTS

The present invention is now described more fully with reference to the accompanying drawings, in which certain illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All patents publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

The present disclosure now will be described more fully, but not all embodiments of the disclosure are necessarily shown. In addition, many modifications may be made to adapt a particular situation or material to the teachings of the disclosure without departing from the essential scope thereof.

Figure 1A:
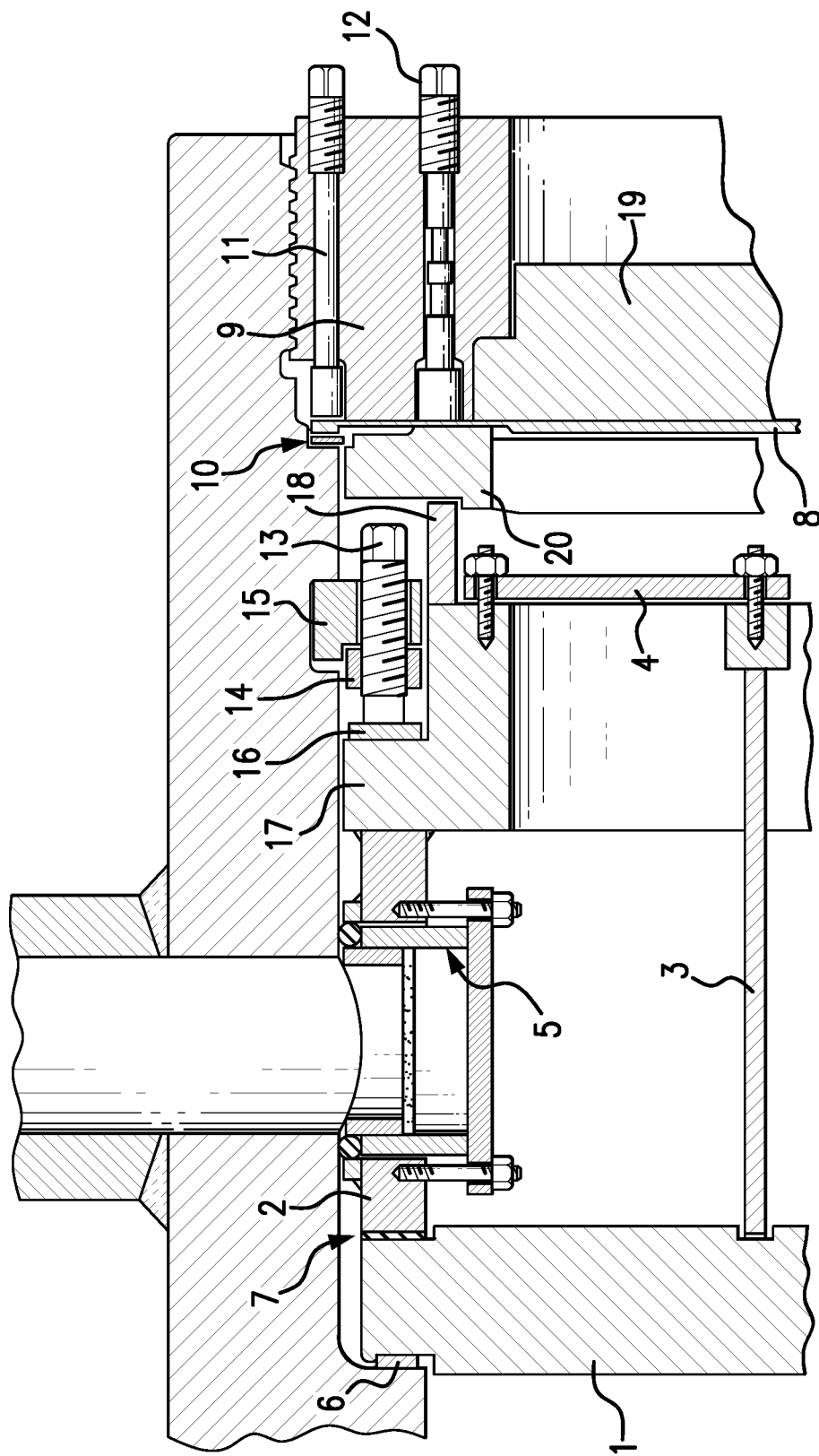
FIG. 1A illustrates a partial cross-sectional view of a prior art tubular heat exchanger and closure assembly as described in U.S. Pat. No. 4,750,554.

It is to be appreciated the present invention overcomes many of the problems associated with prior art heat exchanger closure assemblies. For instance, with reference to FIG. 1A, depicted is a prior art closure assembly for a shell-and-tube heat exchanger which as described in U.S. Pat. No. 4,750,554. Illustrated is a section of a shell-and-tube heat exchanger with a shell and a channel containing a tubular bundle. The channel has ports providing access for fluid to enter and exit the tubes of the bundle. The end closure assembly or "plug" consists of lock ring 9 and cover 19, which incorporates a diaphragm 8 and diaphragm gasket 10. The closure plug assembly is removable, so as to enable insertion and withdrawal of a removable tubular bundle whilst also being capable of maintaining a tight seal and absorbing the resulting loads under high pressure. The open channel of the heat exchanger is closed at its end by the closure plug assembly (i.e. cover 19 and lock ring 9). The lock ring member 9 contains a mechanism to seal the exchanger channel against a diaphragm 8 by compressing a gasket 10 using bolts 11 and a compression ring 20.

The shell side fluid is separated from the channel fluid entering the tubes (not shown) by a tube sheet 1 and a tube sheet gasket 6. Typically, the heat exchanger requires a partition assembly to accommodate a two pass tube side flow arrangement. The partition assembly may include a sleeve member 2, a partition plate 3, a partition cover 4, and/or a ring 17 to direct fluid from a channel inlet nozzle through two or more tube passes to an outlet port. Those skilled in the art will appreciate that the partition may be applied to either the inlet or the outlet.

With continuing reference to the prior art heat exchanger of FIG. 1A, lock ring member 9 is secured against the channel of the shell of the heat exchanger using threads—the lock ring 9 being provided male threads and the channel being provided with corresponding female threads. It is to be understood and appreciated the threads are load bearing surfaces such that when the heat exchanger is being assembled, the threads absorb the bolt pre-load. Further, during operation of the heat exchanger, hydrostatic load is applied to the plug cover assembly 19, which in turn is transferred directly to the aforementioned threads.

Figure 1B:
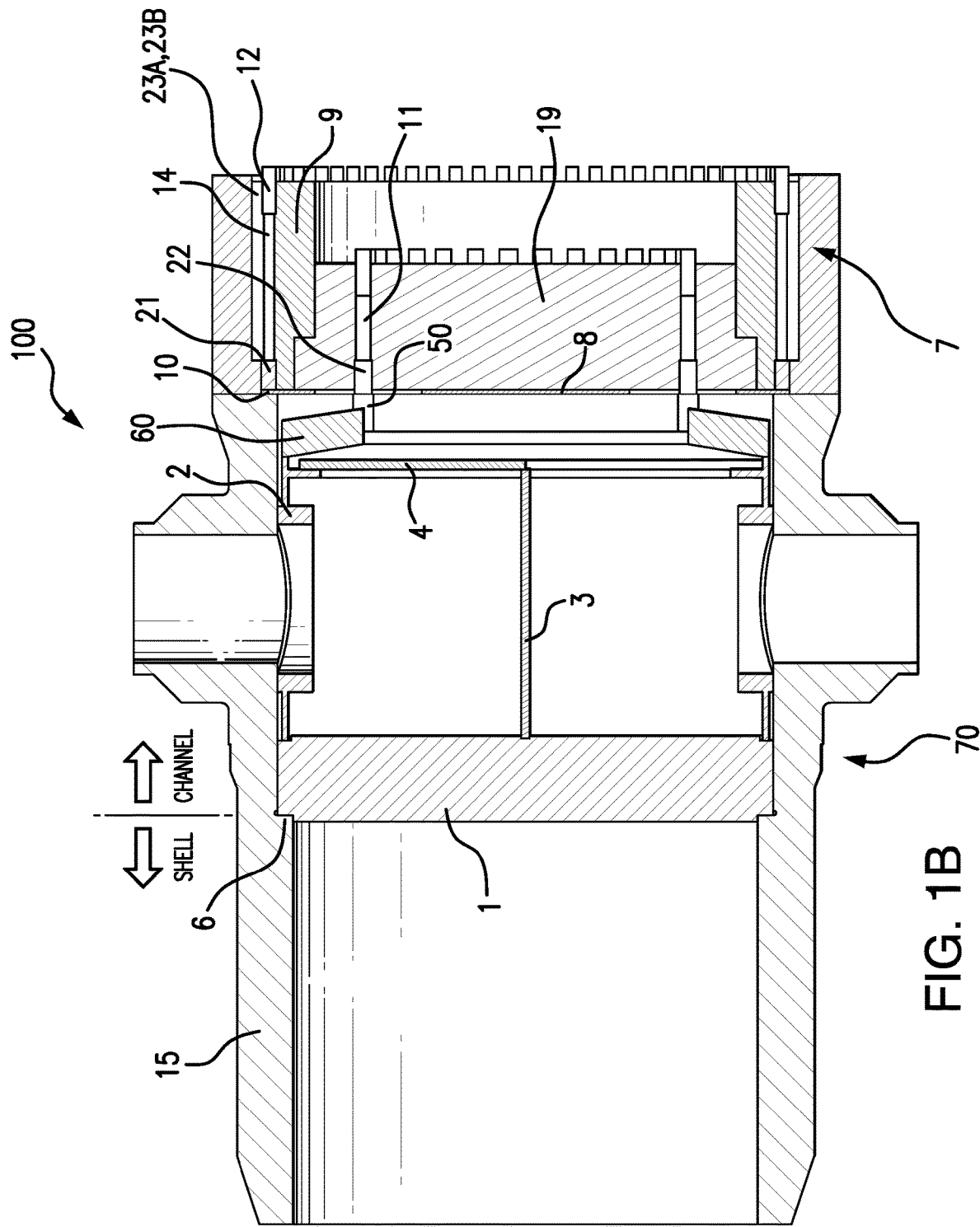
FIG. 1B illustrates a partial cross-sectional view of a tubular heat exchanger and closure assembly which has been constructed in accordance with an illustrated embodiment.

With reference now to FIG. 1B, illustrated is a partial cross-sectional view of a tubular heat exchanger and closure assembly which has been constructed in accordance with an illustrated embodiment of the present invention, referenced generally by numeral 100. Similar to the prior art heat exchanger of FIG. 1A, heat exchanger 100 is a shell-and-tube heat exchanger that includes an enclosure 70 with the enclosure 70 having a shell member 15 integrally formed with or joined to a channel member 7 with the enclosure 70 configured to receive a tube bundle (not shown). The heat exchanger channel member 7 preferably has at least two ports providing access for fluid flow to enter and exit the tubes of the inserted bundle. The end closure assembly or "closure plug" preferably consists of annular lock ring member 9, compression rings 21 and 22, and annular cover member 19. Further included is a diaphragm 8 and a diaphragm gasket 10. The closure plug is removable, so as to enable insertion and withdrawal of a removable tubular bundle whilst also being capable of maintaining a tight seal and absorbing the resulting loads under high pressure during operation of the heat exchanger 100. The open end portion of the channel member 7 is closed (sealed) by the closure plug (e.g., the cover 19 and lock ring 9). The lock ring member 9 preferably contains means to seal the heat exchanger channel 7 against the diaphragm 8 by compressing gasket 10 using bolts 12, push rods 14 and compression ring 21. As shown in FIG. 1B, the cover member 19 is removably secured to the lock ring member 9 such that the lock ring member 9 has an inner diameter surface preferably formed with a countersink configuration configured to receive a cooperating countersink configuration provided on an outer diameter surface of the cover member 9. In accordance with the illustrated embodiments, the smallest inner diameter of the cover member 19 is preferably less than the largest outer diameter of the lock ring member 9 to form the countersink configuration therebetween.

With continuing reference to FIG. 1B, shell side fluid flow is separated from channel fluid flow entering the tubes (not shown) by a tube sheet 1 and tube sheet gasket 6. The heat exchanger 100 typically requires a partition assembly to accommodate a two pass tube side flow arrangement. However those skilled in the art will appreciate that inventive aspects of the present disclosure can be used with single pass heat exchangers or heat exchangers with more than 2 passes. The partition assembly includes in this embodiment a sleeve member 2, partition plate 3, and a partition cover 4 to direct fluid from the channel inlet nozzle through two or more tube passes to the outlet port. It is the be understood the partition may be applied to either the inlet or the outlet.

Figure 4:
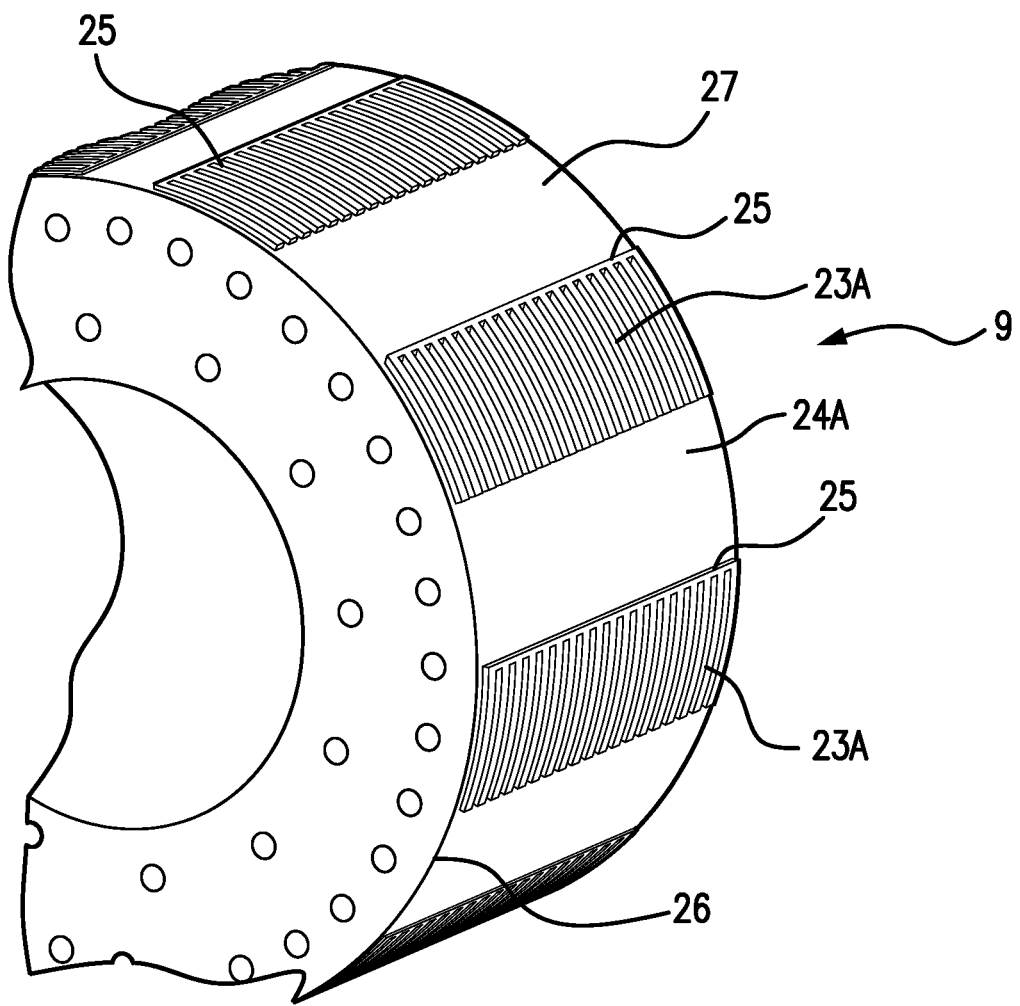
FIG. 4 illustrates a partial perspective view of a lock ring member of FIG. 1B in accordance with an illustrated embodiment.
Figure 6:
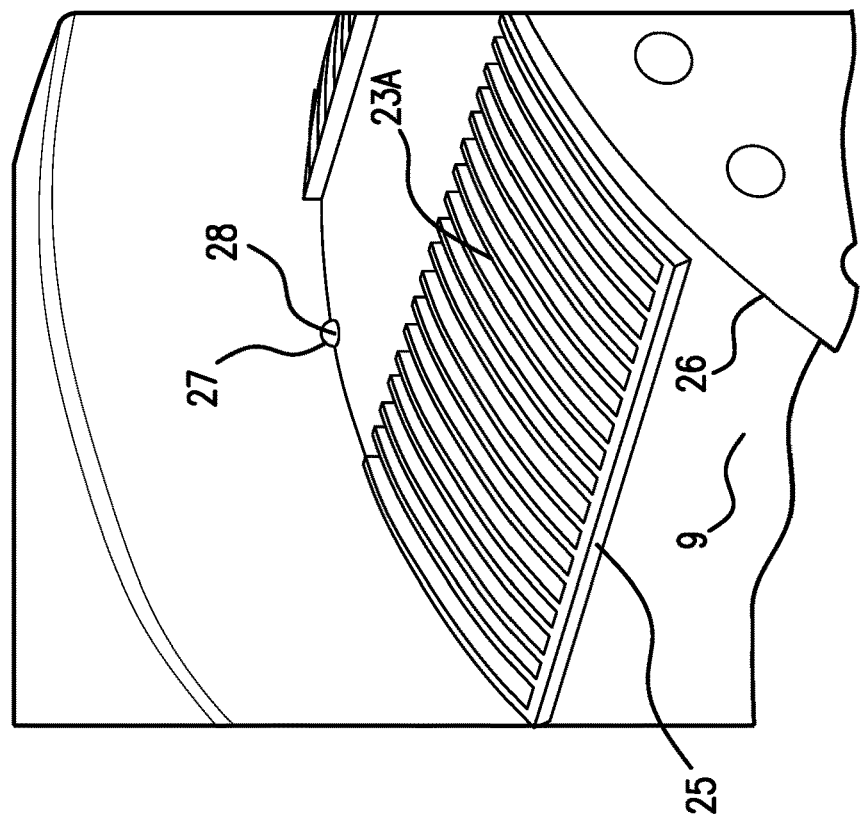
FIG. 6 illustrates a partial perspective view of the lock member of FIG. 4 linearly inserted into the open channel end portion of the heat exchanger of FIG. 5 in accordance with an illustrated embodiment.
Figure 5:
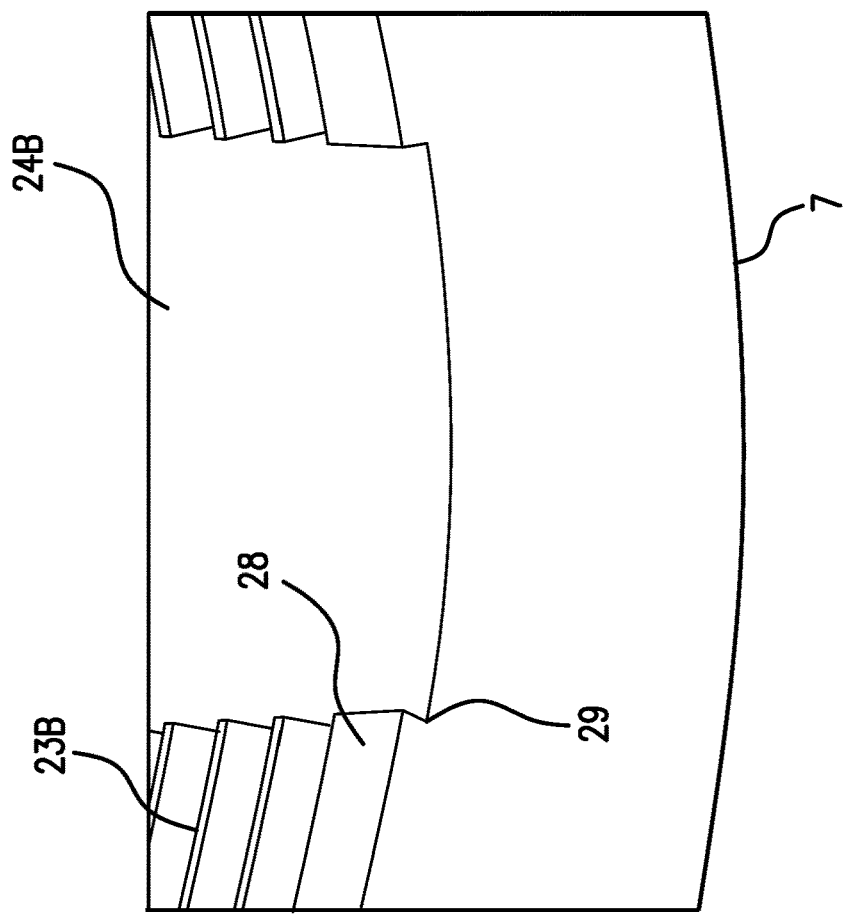
FIG. 5 illustrates a partial perspective view of the inner diameter of the open channel end portion of the heat exchanger of FIG. 1B.

The lock ring member 9 of the closure plug assembly is secured against the open end portion of the channel 7 of the shell of the heat exchanger 100 preferably using a bayonet style locking assembly preferably consisting of formed hub sections 23A and 23B. With reference now to FIGS. 4-6 (and with continuing reference to FIG. 1B), the lock ring member 9 is preferably formed with hub sections 23A formed on the circumferential outer surface portion of the ring member 9, with each hub section 23A separated by semi-cylindrical non-hubbed sections 24A. Similarly, an open end portion of the channel 7 of the heat exchanger 100 is preferably formed with hub sections 23B formed on an inner circumferential end portion of the heat exchanger channel 7 separated by semi-cylindrical non-hubbed sections 24B. The plurality of spaced-apart lock ring hub sections 23A of the lock ring 9 are configured to interdigitate with corresponding channel hub sections 23B formed on a cylindrical inner surface portion of the channel 7 of the heat exchanger 100.

In accordance with the illustrated embodiments, during assembly of the closure plug member (e.g., the ring member 9 and cover member 19) within an end portion of the channel 7 of the heat exchanger 100, the lock ring member 9 is inserted into the open cylindrical channel end 7 coaxially along the longitudinal axis of the interior chamber of the heat exchanger 100 such that the load bearing surfaces of each of the ring member 9 and the inner diameter of the open cylindrical channel end 7 of the heat exchanger 100 such that no load is transferred between the ring member 9 of closure plug assembly and the heat exchanger 100, in contrast the aforementioned prior art structures and methods. Only after the lock ring member 9 is turned for locking engagement with the elongated heat exchanger 100 is there a transfer of load from the heat exchanger 100 to the closure plug member. This is accomplished by turning the ring member 9 of the closure plug assembly about the longitudinal axis of the interior chamber of the elongated heat exchanger 100 to cause the hubs sections 23A of the ring member 9 to removably secure with cooperating hub sections 23B provided on the inner diameter of the open cylindrical channel end 7 of the heat exchanger 100 facilitating the transfer of load from the channel 7 of the heat exchanger 100 to the ring member 9 of the closure plug assembly. Is to be appreciated the ring member 9 is turned less than 360 degrees to cause the hub sections 23A of the ring member to removably secure (interdigitate) with the corresponding hub sections 23B formed on an inner diameter portion of the open cylindrical channel end 7 of the heat exchanger 100. In one embodiment, the ring member 9 is turned approximately 22.5 degrees wherein each hub section 23A and 23B extends approximately 22.5 along the circumference portion of the ring member 9 and the open cylindrical channel end 7 of the heat exchanger 100 they are respectively formed on.

In other embodiments, it is to be further appreciated that the lock ring member 9 and cover member 19 may be integrated into singular unitary component. Additionally, in still other embodiments, the lock ring member 9 may be divided into two or more components. In further embodiments, the hub sections 23A and 23B may have a different shape or design at one portion of the lock ring member 9 relative to another.

In accordance with the illustrated embodiments, the aforesaid hub configuration may be configured in eight sections such that there are eight hubbed sections (23A and 23B) and eight unhubbed regions (24A and 24B) respectively provided on the ring member 9 and the inner diameter of the open cylindrical channel end 7 of the heat exchanger 100. However, those skilled in the art will readily appreciate that the number of hub regions can vary without departing from the inventive aspects of the present disclosure. For example, there may be 1, 2, 3, 4, 5, 6, 7, 8, 9, 10, 11 or 12 hubbed regions combined with 1, 2, 3, 4, 5, 6, 7, 8, 9, 10, 11 or 12 unhubbed regions.

During assembly of the closure plug with the open channel 7 of the heat exchanger, and in contrast to above described prior art, the load bearing surfaces of the hubs 23A and 23B are not damaged during insertion of the closure plug assembly into the heat exchanger channel 7. This arrangement also ensure proper alignment of the diaphragm 8 relative to the heat exchange channel 7. Additionally, it is to be appreciated that the aforesaid hub sections 23A and 23B may be formed (e.g., machined) with a thread pitch such that the closure plug assembly advances axially inwards in the channel 7 of the heat exchanger 100 as it is rotated.

With continuing reference to FIGS. 4-6, and in accordance with certain embodiments, an upstanding rail member 25 is formed adjacent to the channel hubs 23B, or lock ring hubs 23A, or both, to prevent the hubs 23A, 23B from contacting any of the metal surfaces during insertion. It is to be appreciated that providing rails 25 on the lock ring member 9 may be preferred since fabrication may be easier as the lock ring 9 can be independently rotated whilst the channel 7 of the heat exchanger 100 cannot be independently rotated during fabrication.

In accordance with further illustrated embodiments, an annular upstanding stop member 26 (flange) may be provided on the lock ring member 9 that corresponds to the location of the diaphragm 8 referenced herein. The stop member 26 preferably extends around the outer circumference of the lock ring member 9 to ensure that the unhubbed slot shaped cavity that is formed when the lock ring 9 is rotated into place, is covered, and no foreign material can enter. It is noted this facilitates that the cover member 19 and diaphragm 8 are correctly positioned without the need to "estimate" based on external measurements. This is in contrast to prior art screw plug designs in which the location of the lock ring member was determined by the number of turns and the thread pitch which can introduce variation. It is to be appreciated that configuration of stop member 26 shown in FIG. 6 is to be understood as an illustrative configuration as other configurations may be provided to ensure that the unhubbed slot shaped cavity that is formed when the lock ring 9 is rotated into place, is covered, and no foreign material can enter.

As shown in FIGS. 4-6, the hub sections 23A, 23B preferably align perpendicular to the longitudinal axis of the lock ring member 9 and the channel 7 of the heat exchanger 100. It is to be appreciated in other embodiments, the hub sections may be formed (e.g., machined) at an angle relative to the longitudinal axis of the lock ring member 9 and the channel 7 of the heat exchanger 100 such that the lock ring member 9 advances a smaller distance into the channel 7 upon rotation of the lock ring member. It is to be further appreciated that hub size and shape for hub sections 23A and 23B need not be identical for all hub sections contingent upon that the length of the lock ring member 9 and channel 7 assembly permit the lock ring member 9 to be freely inserted in the channel 7, and the hub sections 23A and 23B of the lock ring member 9 and channel 7 correspond with one another.

With specific reference now to FIG. 6, the lock ring member 9 of the closure plug assembly is shown being inserted into the open end of the channel 7 of the heat exchanger. It is to be appreciated that the lock ring member 9 is inserted into channel 7 such that the unhubbed regions 24A, 24B of the lock ring 9 and channel 7 respectively allow the hubbed regions 23A, 23B to slide past. For example, the closure plug assembly may be loaded (the lock ring member 9) into the heat exchange channel 7 at an angle of about 22.5° from the final locked orientation such that the unhubbed regions 24A, 24B of the lock ring 9 and channel 7 respectively allow the hubbed regions 23A, 23B to slide past such that load bearing surfaces are prevented from coming into contact by the rails. Once the closure plug member is fully inserted into the channel 7 of the heat exchanger, it is rotated into a locked position. For instance, the closure plug assembly may be turned 22.5° clockwise into the locked position. This rotation can be accomplished in a number of ways, for instance using a bar bolted to the lock ring member 9 to provide sufficient leverage to turn the lock ring member 9 manually, or by the use of a cable attached to the lock ring member 9 and a crane to provide an upwards tangential force, or by the use of circular rack gears mounted to the heat exchanger channel 7 and a corresponding pinion gear mounted to the lock ring member 9, with a lever used to turn the pinion gear which in turn applies a tangential force to rotate the lock ring member 9. A further safety feature may be provided whereby a notch 27 is provided in one set of hubs of the lock ring member 9 and a corresponding guide notch 28 is formed in the open end portion of the channel 7 of the heat exchanger to ensure that the lock ring member 7 can only be inserted in one orientation relative to the channel 7.

Referring to FIG. 4, external markings on the lock ring 9 and channel 7 further emphasize the correct orientation of the lock ring member 9 and an upstanding stopper member 29 may be formed in the open end portion of the channel 7 adjacent the unhubbed region 24B having a width wider than the width of an rail 27 provided in a hub sections 23A to ensure that the respective hubs 23A and 23B cannot accidentally rotate and engage prematurely during insertion whilst also helping to guide the insertion of the lock ring 9 such that the hubs 23A and 23B remain protected.

Figure 3:
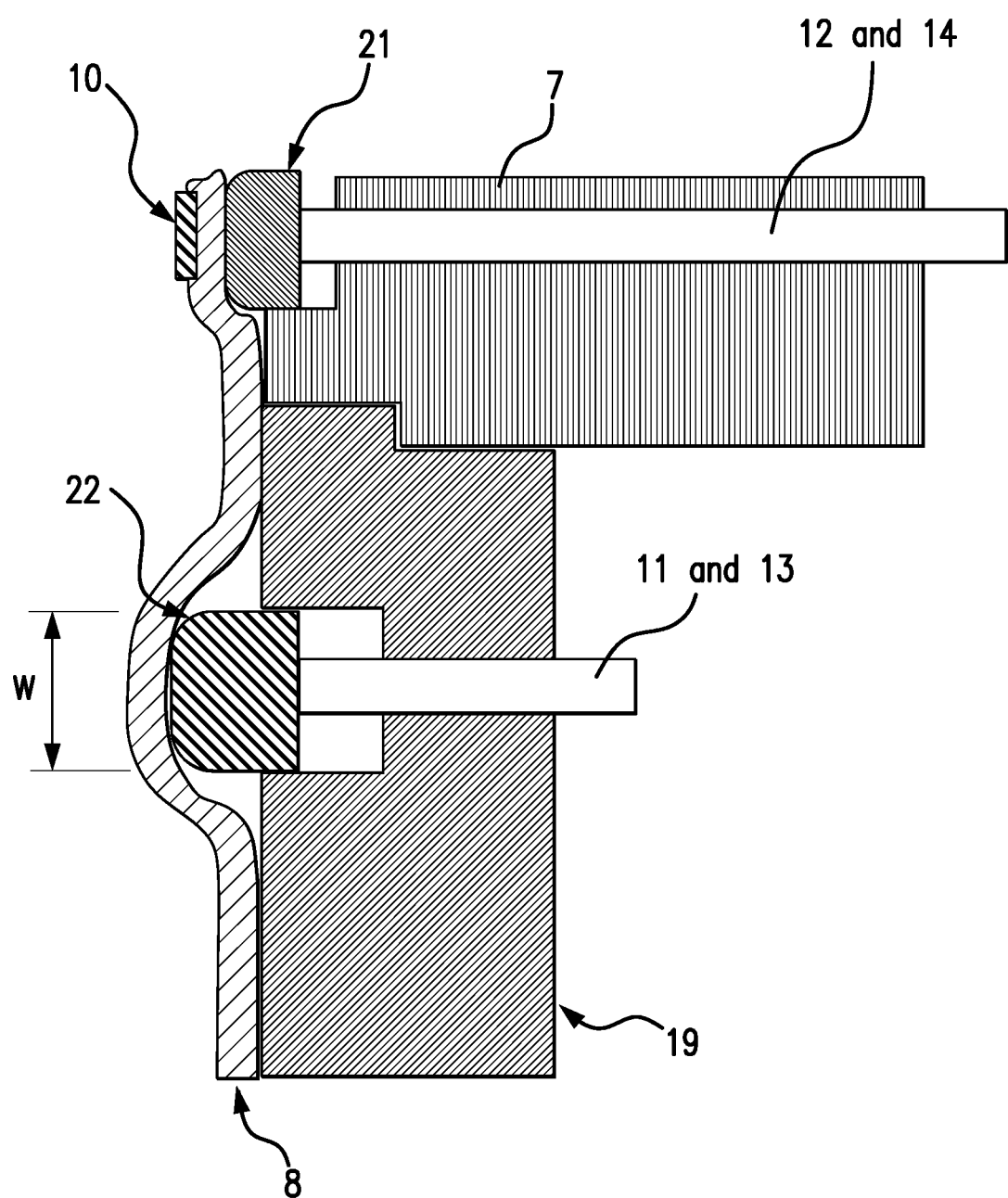
FIG. 3 illustrates a exploded partial cross-section view of a compressed diaphragm seal in accordance with an illustrated embodiment.

With reference now to FIGS. 1B and 3, a diaphragm 8 is preferably engaged against the channel cover member 19 such that pressure load from fluid flow in the channel 7 of the heat exchanger is transmitted across the diaphragm 8 to the channel cover member 19. The pressure load on the channel cover member 19 is then transmitted to lock ring member 9. The channel 7 is preferably sealed by a diaphragm gasket 10. The diaphragm gasket 10 is preferably compressed by a plurality of compression bolts 12 and push rods 14 (collectively "compression members") axially provided along an outer row of the lock ring member 9 which pass through threaded holes preferably formed in the lock ring member 9. These compression bolts 12 and push rods 14 transmit a force via a loose outer compression ring 21 provided intermediate the lock ring member 9 and diaphragm 8 to a rim portion of the diaphragm 8 and its diaphragm gasket 10. It is to be understood that the inner row of compression bolts 11, 13 may be located along the radius of either the annular cover member 19 or lock ring 9 member as required by the diameters of elastic torsion member 60 and bearing ring 50, as described below.

It is to be appreciated the diaphragm 8 is configured to preferably deflect a certain amount under the bolt preloads and internal pressure whereby if the closure plug member assembly is not inserted far enough axially inwards in the channel 7 of the heat exchanger 100, then the outer row of push bolts 14 of the lock ring member 9 will need to be advanced further to cause the diaphragm gasket 10 to seal, and the inner row of push bolts 13 of the cover member 19 will need to be advanced further to cause the tube sheet gasket 6 to seal, thereby causing the diaphragm 8 to deform to a greater extent when pressure is applied to the channel 7. During the time of manufacture dimensional checks can be performed to ensure that machining tolerances are acceptable to properly locate the closure. After manufacturing, shims can be added between the diaphragm 8 and the closure plug assembly. Alternatively, the hubs on the closure plug assembly can be machined with a pitch such that the closure plug assembly advances axially inwards in the channel 7 of the heat exchanger 100 as it is rotated. By rotating the closure plug assembly until it contacts the diaphragm 8, then advancing the outer row of push bolts 14 to compress the gasket 21, then retracting the outer row of push bolts 14, the closure plug can be rotated further to minimize the gap between the closure plug assembly and the diaphragm 8. Once the dimensional check is performed, the closure plug assembly is inserted in a linear motion into the channel 7 of the heat exchanger 100, which may be accomplished using a fork lift truck, a crane or other combination of equipment already required for the handling of the tube bundle, thus no special tooling or equipment is necessary in contrast to the aforementioned prior art.

During assembly, and with reference now to FIGS. 1B and 3, it is to be appreciated that when the inner row of compression bolts 13 of the cover member 19 are tightened, an axial load is transferred through push rods 11 to a loose (inner) compression ring 22 through diaphragm 8 to a tubesheet loading assembly consisting of a bearing ring 50, an elastic torsion member 60 and sleeve member 2 such that the tube sheet gasket 6 is compressed against the rear face of the tube sheet 1 and the shell 15. This axial load is referred to as the preload. It is to be appreciated that this preload prevent leaks due to the differential pressure between the shell side and tube side of the heat exchanger 100.

It is to be further appreciated that the aforementioned tubesheet loading assembly preferably accommodates thermal loads which cause differential thermal expansion between the channel 7, tubesheet 1 and aforesaid tubesheet loading assembly (e.g., bearing ring 50, an elastic torsion member 60 and sleeve member 2). The differential thermal expansion is caused by two mechanisms. The first is when the channel 7 is cooler than the tubesheet 1 and tubesheet loading assembly (e.g., bearing ring 50, an elastic torsion member 60 and sleeve member 2) due to the hot process fluid flow, which is in intimate contact with the internal components but largely shielded from the channel 7 by the sleeve member 2, and by the loss of heat in the channel 7 to the surrounding environment or by rapid changes in fluid temperature which cause the temperature of the relatively thin internal components to change at a faster rate than the comparatively thick channel. Such conditions will inevitably occur during start up (heating) and during an upset or plant trip and subsequent re-establishing of the operating temperature. The second mechanism is when the material used for formation of the channel 7 has a lower thermal expansion coefficient than the materials used for the tubesheet 1 and tubesheet loading assembly (e.g., bearing ring 50, an elastic torsion member 60 and sleeve member 2). For instance, this is common when carbon steel is used for the channel 7 and stainless steel is used for components inside the heat exchanger.

When the total thermal expansion of the tubesheet 1 and tubesheet loading assembly (e.g., bearing ring 50, an elastic torsion member 60 and sleeve member 2) is greater than the total thermal expansion of the channel 7, the resulting differential thermal expansion must be accommodated by deformation in the heat exchanger 100. Due to the relatively high stiffness of the channel 7 required for safe containment of pressure, the deformation primarily occurs in the relatively lower stiffness members in the tubesheet loading assembly (e.g., bearing ring 50, an elastic torsion member 60 and sleeve member 2). If the stresses caused by this deformation exceed the yield stress of the members, unrecoverable, or plastic, deformation results. The sleeve member 2, due to the presence of perforations formed therein for admitting fluid into the interior chamber of the heat exchanger 100, does not have uniform stiffness all around. Hence the thermal loads may result in uneven plastic deformation of the sleeve member 2 such that the load on the gasket 22 cannot be recovered simply by re-tightening the inner row of compression bolts 13. When the thermal loads are returned to normal the remaining axial compression load in the tubesheet loading assembly (bearing ring 50, an elastic torsion member 60 and sleeve member 2) is reduced below the loads applied during the tightening of compression bolts 13 of the cover member. This load can be reduced below the minimum load required for sealing of tubesheet gasket 6 if the plastic deformation is severe enough. This results in an undesirable leak between the shell side and tube side of the heat exchanger 100.

Figure 2:
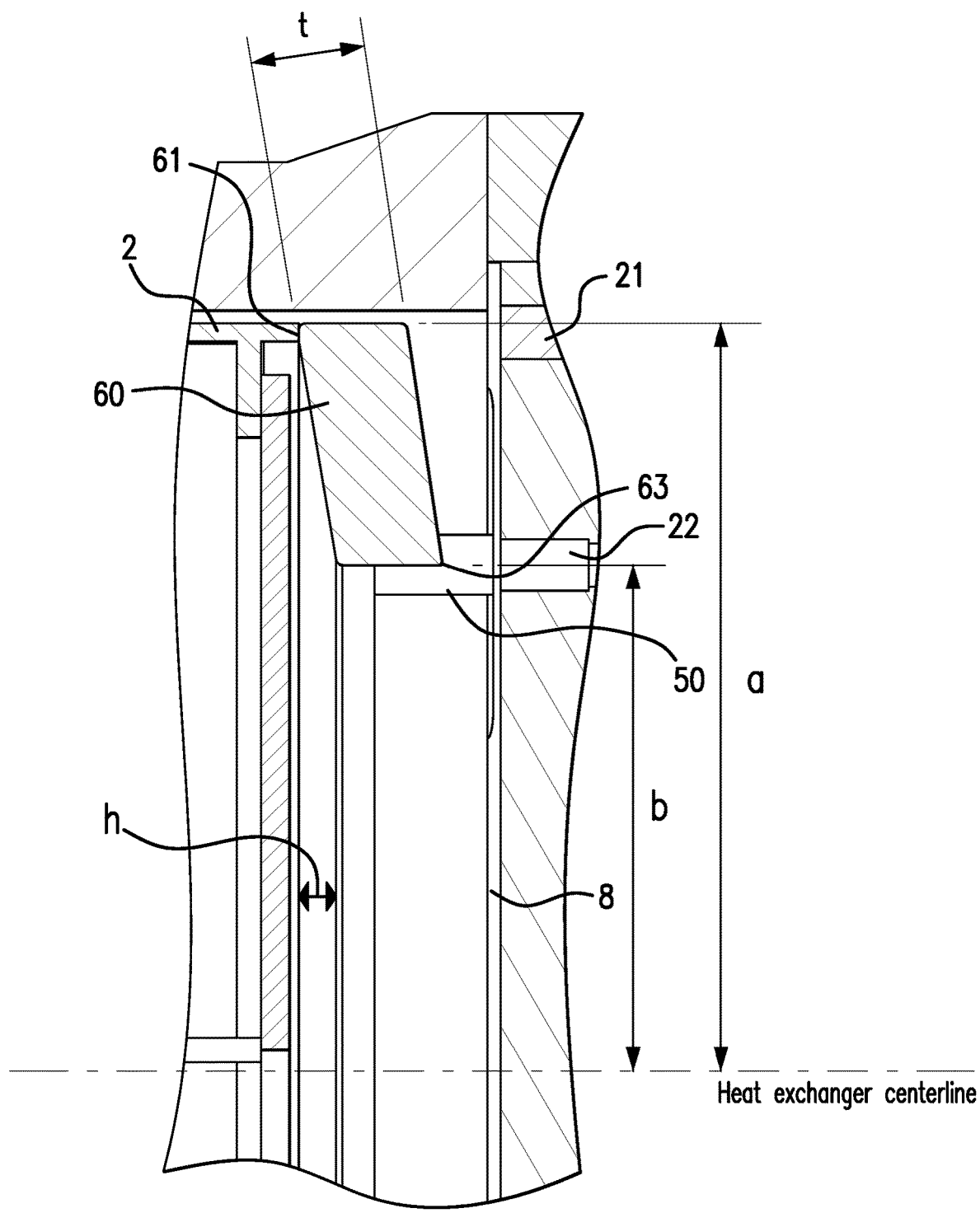
FIG. 2 illustrates an exploded partial cross-sectional view of FIG. 1B depicting an elastic torsion member in accordance with an illustrated embodiment.

In accordance with the illustrated embodiments, to accommodate the differential thermal expansion without plastic deformation in the heat exchanger, provided is a compliant member, as now described. The complaint member is achieved through implementation of an elastic torsion member 60, as shown in FIGS. 1B and 2. As shown, the annular elastic torsion member 60 preferably contacts at an outer circumference portion, at a first contact area 61, the sleeve member 2 on the side facing the tubesheet 1 in proximity to its outer radius, and contacts, at an inner circumference portion, the bearing ring 50, at a second contact area 63, on the side facing the diaphragm 8, in proximity to its inner radius. When the inner compression bolts 13 are preloaded, axial forces are transmitted through the elastic torsion member 60 at its aforementioned contact areas 61 and 63. These forces applied at different radii upon the elastic torsion member 60 create a torsional load on the elastic torsion member 60 such that its an inner circumference is deflectable relative to its outer circumference in an axial direction for torsioning the elastic torsion member 60 such that this torsional load is resisted by an increase in stress and a torsional rotation which allows the outside radius of the elastic torsion member 60 to move towards the diaphragm 8 of the closure plug assembly and its inside radius to move towards the tubesheet 1.

It is to be appreciated the bearing ring 50 protects the diaphragm 8 from damage from contact with the elastic torsion member 60 during rotation. When the heat exchanger 100 is in operation, pressure loads will reduce the load on the elastic torsion member 60 by deforming the closure plug assembly away from the tubesheet 1, but differential thermal expansion will increase the load. It is to be understood the elastic torsion member 60 is designed and configured to elastically deform up until a maximum required differential thermal expansion is reached. When loads during heat exchanger operation remain below this maximum threshold, the loads in the elastic torsion member 60 will return to the initial preload when thermal and pressure loads are removed. In accordance with the illustrated embodiments, the elastic torsion member 60 may be formed to have a deflection range between 25 mm to 75 mm—however the elastic torsion member 60 is not to understood to be limited to the aforesaid deflection range as it may be configured as a function of the scale of the dimensional size of the heat exchanger 100. However, if excessive differential thermal expansion is encountered, such as during an unintended thermal excursion of the process fluid, the elastic torsion member 60 deforms plastically to limit loads applied to the closure plug assembly for preventing failure of the closure plug assembly and/or the seal provided by the diaphragm 8. It is to be appreciated that when the thermal and pressure loads are removed, the loads on the elastic torsion member 60 will drop below the initial preload, and may drop as low as zero. The elastic torsion member 60 may be formed of materials that are not subject to corrosion, creep and loss of strength at high temperatures, preferably high-nickel alloys including (but not limited to) Inconel 625 and Inconel 718.

With reference now to FIG. 2, illustrative relevant dimensions for design of the elastic torsion member 60 are now described. It is to be understood dimension "a" is the outside radius, dimension "b" is the inside radius, dimension "h" is the height, and dimension "t" is the thickness of the elastic torsion member 60. Dimension "a" is less than the inside radius defined by the channel 7 of the heat exchanger 100 so as to provide clearance for radial thermal expansion and rotation under load. The ratio a/b is greater than 1 and preferably less than 3 for an axial load to create a torsional load in the elastic torsion member 60. The dimension "h" is approximately 50% of its elastic deflection limit when preload and operational loads (pressure and thermal) are applied. The dimension "t" is selected such that the axial load is below the maximum allowable load on the tubesheet gasket 6 when the elastic torsion member 60 is compressed by the sum of the preload displacement and design differential thermal expansion such that the elastic torsion member 60 deforms elastically. The material of the elastic torsion member 60 is selected such that the member will plastically deform above this maximum allowable load. It is to be appreciated that tubesheet 1, sleeve member 2, bearing ring 50, compression ring 22, compression rods 11 and compression bolts 13 are designed to remain elastic up to or above the total axial load from preload, thermal and pressure loads.

Figure 7:
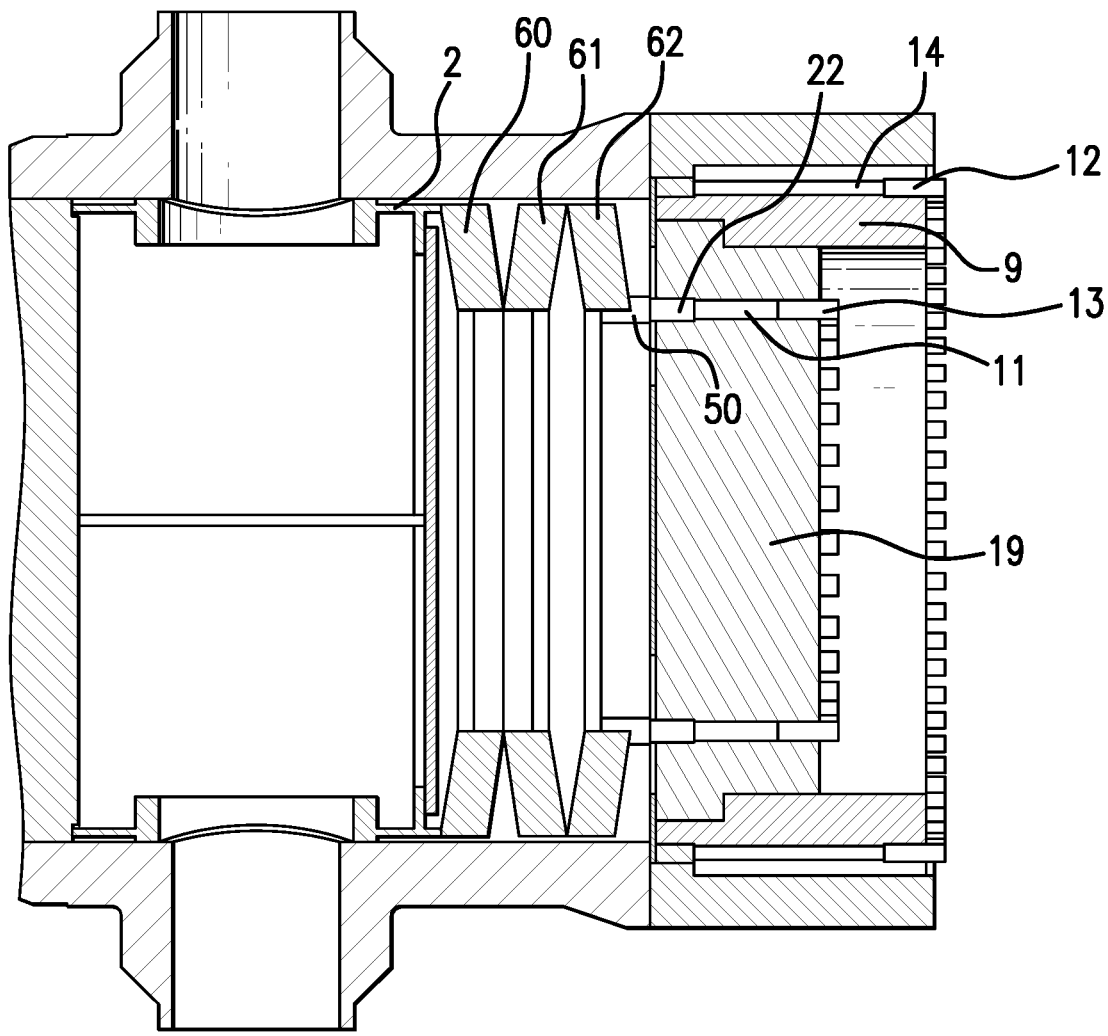
FIG. 7 illustrates a partial cross-sectional view of a tubular heat exchanger and closure assembly having multiple elastic torsion members in accordance with another illustrated embodiment.

It is to be appreciated that in the illustrated embodiments (e.g., FIGS. 2 and 3), the elastic torsion member 60 is to be understood to have a quadrilateral cross-section having rounded corner portions. In alternative illustrated embodiments, other configurations of cross-sections for the elastic torsion member 60 may be used including a rectangular shape or a shape with generally rounded sides. Additionally, in the embodiments illustrated herein, the tubesheet loading assembly includes a single elastic torsion member 60. It is to be understood that some embodiments, in order to meet design requirements for minimum pressure applied to the tubesheet gasket 6 and maximum displacement applied to the diaphragm 8, the elastic torsion member 60 may be designed with a high stiffness such that the maximum thermal expansion cannot be accommodated without plastic deformation. In such an instance, more than one elastic torsion members 60 may be stacked in series to increase the thermal expansion capacity. For instance, FIG. 7 illustrates a design using three elastic torsion members 60. It is to be appreciated that when an odd number of elastic torsion members 60 is utilized, the inner compression bolts (11, 13 and 22) may be in common bolt circle radius provided in the cover plate member 19. And when an even number of elastic torsion members 60 is utilized, the inner compression bolts are preferably located in the lock ring member 9 at a larger bolt circle radius. Additionally, in designs with multiple elastic torsion members 60, an alignment ring is preferably included for maintaining alignment with one another.

With reference now to FIG. 3, illustrated is the behavior of the diaphragm 8 after preload of the compression bolts 13 and 14 and application of pressure from the channel 7 of the heat exchanger 100. As shown, at the diaphragm gasket 10, the compression ring 21 is displaced away from the lock ring member 9 of the closure plug assembly to compress the diaphragm 8 and diaphragm gasket 10. When pressure is applied from the channel 7 of the heat exchanger 100, the diaphragm 8 is deformed until it rests against the lock ring member 9 and cover plate member 19 in region 31. This creates an area with high bending strains in the diaphragm 8 at a radius smaller than that of the compression ring 21. In order to prevent rupture of the diaphragm 8, the compression ring 21 is preferably wider and formed with a curved surface to reduce the bending strains.

Similar to the outer compression ring 21, the inner compression ring 22 is displaced away from the cover member 19 of the closure plug assembly to compress the diaphragm 8 and tubesheet loading assembly. As shown, the diaphragm 8 is bent around both sides of the inner compression ring 22 when pressure from the channel 7 of the heat exchanger is applied, creating two areas with high bending strains in diaphragm 8. In order to prevent rupture of the diaphragm 8, the inner compression ring 22 may also be made wider and given a curved surface to reduce the bending strains.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

Figure 8:
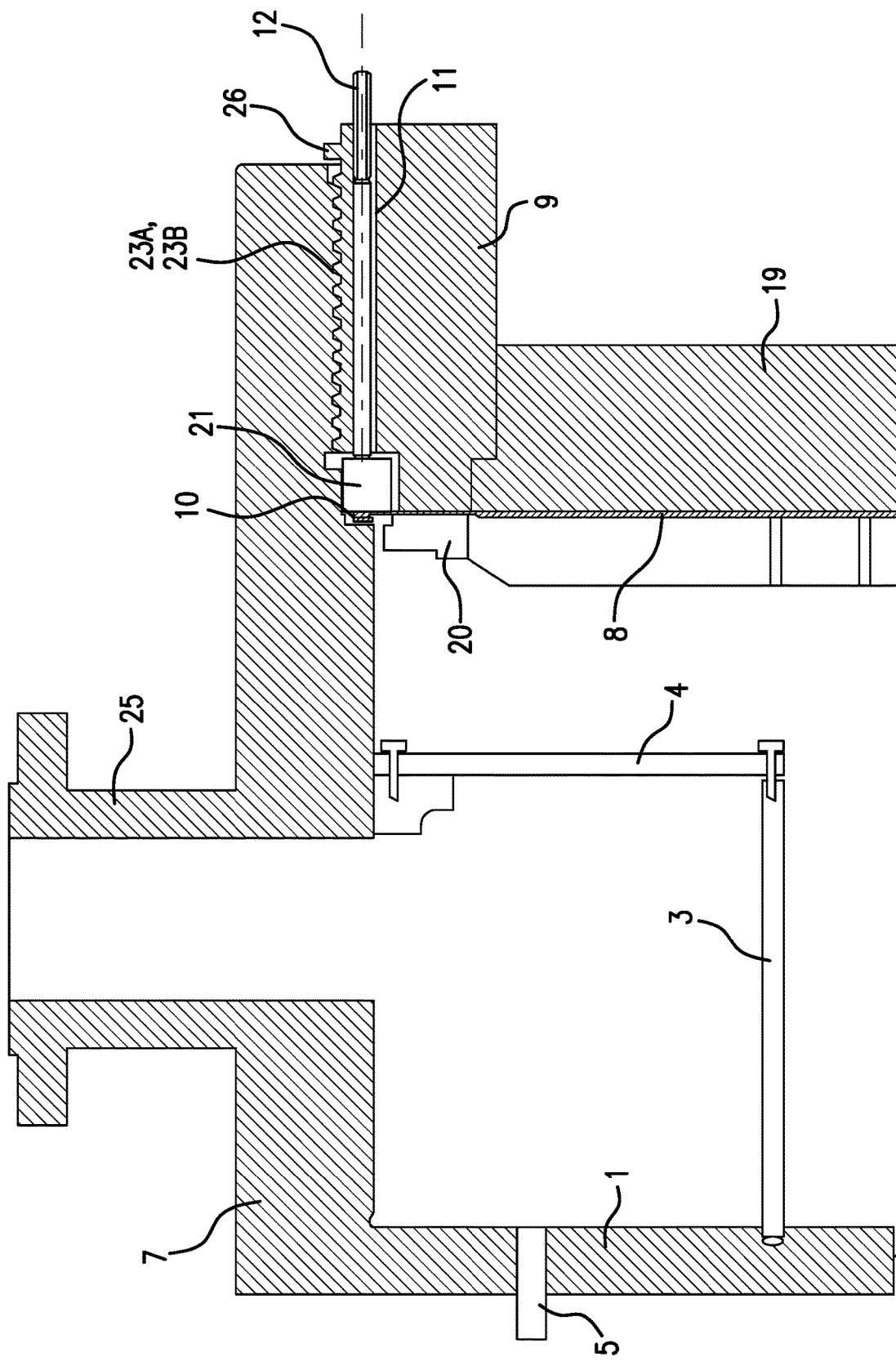
FIG. 8 illustrates partial cross-sectional view of B-style heat exchanger closure plug assembly in accordance with another illustrated embodiment.

For instance, there are A-style and B-style breechlock closures. The above illustrated embodiments relate to the A-style which is typically used for feed effluent type applications where the shell side and tube side fluids are not independent such that the tube sheet can be designed for the differential pressure only. However, the illustrated embodiments are not to be understood to be limited to such an A-style breechlock closure as it also encompasses B-style closures in which the tube sheet is welded to the channel and there is no requirement to load a tube sheet gasket and hence no inner row of bolts, as shown for instance in FIG. 8. It is to be further understood that illustrated embodiments may be utilized with various prior art methods for accomplishing internal sealing.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. An operation method for a heat exchanger assembly comprising a heat exchanger enclosure configured for accommodating differential thermal expansion of internal components in an interior chamber of the heat exchanger enclosure during heating and cooling sequences, the method comprising:
    preloading an elastic torsion member within the interior chamber of the heat exchanger enclosure, including applying a preload to different radii of the elastic torsion member which causes the elastic torsion member to elastically deflect to accommodate the preload, wherein the different radii of the elastic torsion member correspond to a first contact area of the elastic torsion member where the elastic torsion member contacts a sleeve member and a second contact area of the elastic torsion member where the elastic torsion member contacts a bearing ring; and
    thermally loading the heat exchanger assembly, including differentially thermally expanding the internal components in the interior chamber of the heat exchanger enclosure and applying a torsional load to the preloaded elastic torsion member which causes the elastic torsion member to further elastically deflect to accommodate the torsional load.

2. The operation method of claim 1, wherein the differentially thermally expanding the internal components includes accommodating differential thermal expansion of at least the bearing ring, the elastic torsion member, the sleeve member and a tube sheet absent plastic deformation of at least the bearing ring, the elastic torsion member, and the sleeve member due to the differential thermal expansion.

3. The operation method of claim 1, wherein the preloading the elastic torsion member includes:
    preloading bolts that couple the heat exchanger enclosure to at least a portion of an end closure assembly thereby imparting axial forces through the elastic torsion member at the different radii of the elastic torsion member to create a torsional load on the elastic torsion member.

4. The operation method of claim 3, wherein the preloading the elastic torsion member with the bolts includes pivoting the elastic torsion member at the first contact area where the elastic torsion member contacts the sleeve member and at the second contact area where the elastic torsion member contacts the bearing ring.

5. The operation method of claim 1, further comprising:
    inserting a tube sheet gasket into an open cylindrical channel end axially along a longitudinal axis of the heat exchanger enclosure to be positioned adjacent a channel shoulder in the heat exchanger enclosure;
    inserting a tube sheet into the open cylindrical channel end axially along the longitudinal axis of the heat exchanger enclosure to be positioned adjacent the tube sheet gasket, including defining a shell side and a channel side within the interior chamber of the elongated heat exchanger enclosure, wherein the interior chamber is configured to removably receive a tube bundle positioned within the shell side of the interior chamber;
    inserting the sleeve member into the open cylindrical channel end axially along the longitudinal axis of the heat exchanger enclosure to be positioned adjacent the tube sheet;
    inserting the elastic torsion member into the open cylindrical channel end along the longitudinal axis of the heat exchanger enclosure so as to be positioned adjacent the sleeve member;
    inserting the bearing ring into the open cylindrical channel end along the longitudinal axis of the heat exchanger enclosure so as to be positioned adjacent the elastic torsion member; and
    inserting a diaphragm into the open cylindrical channel end along the longitudinal axis of the heat exchanger enclosure so as to be positioned adjacent the bearing ring.

6. The operation method of claim 1, further comprising:
    affixing a closure assembly having a deflectable diaphragm and a bearing ring to an open end portion of the interior chamber, including imparting the preload torsional load to the elastic torsion member via a mechanism of the closure assembly.

7. The operation method of claim 1, wherein the elastic torsion member is configured to deflect elastically up to an elastic deflection limit and deflect plastically above the elastic deflection limit, and
    wherein the preloading the elastic torsion member and the thermally loading the heat exchanger assembly include deflecting the elastic torsion member by an amount less than the elastic deflection limit such that the elastic torsion member deflects elastically to accommodate differential thermal expansion.

8. An operation method for a heat exchanger assembly comprising a heat exchanger enclosure configured for accommodating differential thermal expansion of internal components in an interior chamber of the heat exchanger enclosure during heating and cooling sequences, the method comprising:
    preloading an elastic torsion member within the interior chamber of the heat exchanger enclosure, including applying a preload to the elastic torsion member which causes the elastic torsion member to elastically deflect to accommodate the preload;
    thermally loading the heat exchanger assembly, including differentially thermally expanding the internal components in the interior chamber of the heat exchanger enclosure and applying a torsional load to the preloaded elastic torsion member which causes the elastic torsion member to further elastically deflect to accommodate the torsional load; and
    applying a pressure load within the interior chamber of the heat exchanger enclosure, including reducing the torsional load on the elastic torsion member by elastically deflecting a closure assembly removably attached to the heat exchanger enclosure and relaxing the elastic torsion member to accommodate the pressure load.

9. A method, comprising:
preloading an elastic torsion member within an interior chamber of a heat exchanger enclosure of a heat exchanger assembly; and
thermally loading the heat exchanger assembly to differentially thermally expand internal components in the interior chamber of the heat exchanger enclosure, including applying a torsional load to the preloaded elastic torsion member,
wherein the elastic torsion member is configured to deflect elastically up to an elastic deflection limit and deflect plastically above the elastic deflection limit, and
wherein a combination of the preload and the torsional load on the elastic torsion member results in deflection of the elastic torsion member below the elastic deflection limit such that the elastic torsion member deflects elastically to accommodate the differential thermal expansion of the internal components.

10. The method of claim 9, further comprising:
applying a pressure load within the interior chamber of the heat exchanger enclosure, including reducing the torsional load on the elastic torsion member.

11. The method of claim 10, wherein the reducing the torsional load includes elastically deflecting a closure assembly removably coupled to the heat exchanger enclosure and relaxing the elastic torsion member.

12. The method of claim 11, wherein a combination of the preload, torsional load, and pressure load on the elastic torsion member results in deflection of the elastic torsion member below the elastic deflection limit such that the elastic torsion member deflects elastically.

13. A device, comprising:
a heat exchanger assembly, including:
   a heat exchanger enclosure having an interior chamber;
   a tube sheet positioned within the interior chamber of the heat exchanger enclosure, the tube sheet configured to removably receive a tube bundle;
   a sleeve member positioned within the interior chamber of the heat exchanger enclosure; and
   an elastic torsion member positioned within the interior chamber of the heat exchanger enclosure between the sleeve member and a bearing ring, wherein the sleeve member is positioned between the tube sheet and the elastic torsion member, wherein the elastic torsion member is configured to deflect elastically up to an elastic deflection limit and deflect plastically above the elastic deflection limit,
wherein the heat exchanger assembly is configured to apply at least a preload, a thermal load, and a pressure load to the elastic torsion member that, in combination, result in deflection of the elastic torsion member below the elastic deflection limit such that the elastic torsion member deflects elastically to accommodate differential thermal expansion,
wherein the heat exchanger assembly is configured to apply the preload to different radii of the elastic torsion member, and
wherein the different radii of the elastic torsion member correspond to a first contact area of the elastic torsion member where the elastic torsion member contacts the sleeve member and a second contact area of the elastic torsion member where the elastic torsion member contacts the bearing ring.

14. The device of claim 13, wherein the elastic torsion member is further configured to pivot at one or both of the first contact area and the second contact area.

15. The device of claim 13, wherein the elastic torsion member is further configured to pivot at both the first contact area and the second contact area.

16. The device of claim 13, wherein the elastic torsion member has an inner circumference deflectable relative to its outer circumference for torsioning the elastic torsion member.

17. The device of claim 13, wherein the tube sheet separates the interior chamber into a shell side and a channel side, the heat exchanger assembly further including:
a partition assembly including the sleeve member positioned within the channel side of the interior chamber of the heat exchanger enclosure to direct fluid from a port extending through the enclosure to at least two or more tubes in the tube bundle.

18. The device of claim 17, wherein the heat exchanger assembly further includes:
a tube sheet gasket positioned between the tube sheet and a shoulder within the interior chamber of the heat exchanger enclosure.

19. The device of claim 13, wherein the heat exchanger assembly is configured to apply the preload by preloading bolts that couple the heat exchanger enclosure to at least a portion of an end closure assembly of the heat exchanger assembly thereby imparting axial forces through the elastic torsion member at the different radii of the elastic torsion member to create a torsional load on the elastic torsion member.

20. The device of claim 13, wherein the heat exchanger assembly further includes:
a closure assembly; and
a plurality of bolts removably coupling the closure assembly to an open end of the heat exchanger enclosure to selectively seal the interior chamber, wherein the plurality of bolts are configured to apply the preload to the elastic torsion member.

* * * * *